E. TANGYE.
APPARATUS FOR WELDING CHAIN LINKS.
No. 64,722. Patented May 14, 1867.
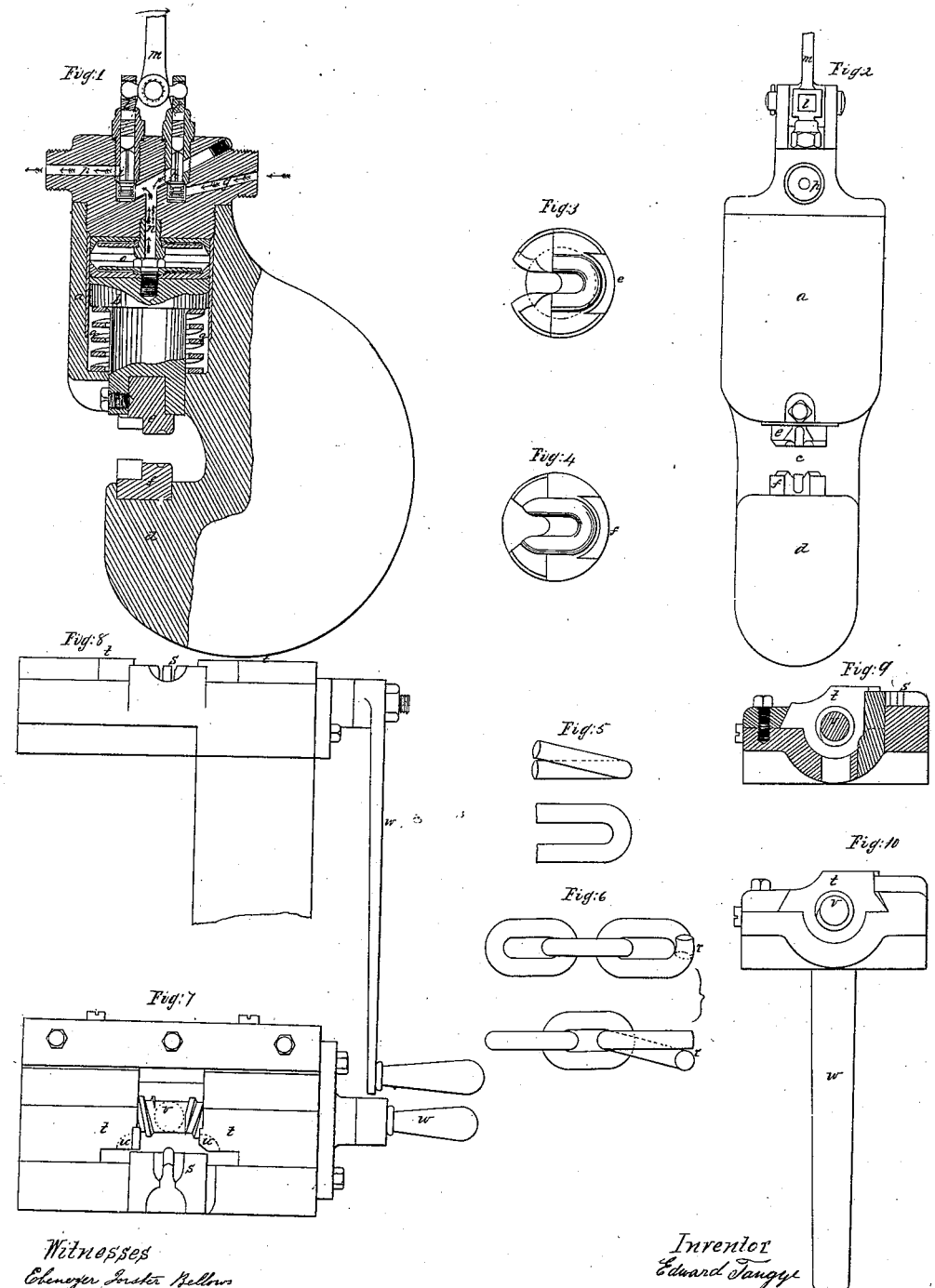
Witnesses
Ebenezer Foster Bellows
Peter Vinneburg
Inventor
Edward Tangye

United States Patent Office.

EDWARD TANGYE, OF BRUSSELS, BELGIUM.

*Letters Patent No. 64,722, dated May 14, 1867; antedated April 26, 1867.*

IMPROVED APPARATUS FOR WELDING CHAIN-LINKS.

*The Schedule referred to in these Letters Patent and making part of the same.*

TO ALL TO WHOM IT MAY CONCERN:

Be it known that I, EDWARD TANGYE, of the firm of TANGYE BROTHERS, of Brussels, in the Kingdom of Belgium, manufacturers, a subject of the Queen of Great Britain, have invented or discovered new and useful "Improvements in the Manufacture of Welded Iron Chain and Welded Steel Chain, and in tools to be employed in the said manufacture;" and I, the said EDWARD TANGYE, do hereby declare the nature of the said invention, and in what manner the same is to be performed, to be particularly described and ascertained in and by the following statement thereof, that is to say—

My invention consists of the following improvements in tools to be used in the manufacture of welded iron chain and welded steel chain. I make the dies, by means of which I effect the welding of the links, of such a figure that the space enclosed between them when they are closed nearly resembles that of the link to be made, such portions only of the dies being cut away as is necessary to admit the end of the link last formed, and through which the link about to be welded has been passed. By giving the dies, as far as possible, the figure of the whole of a link, instead of only one-half of a link, as is commonly done, I secure great uniformity in the size of the links, which uniformity of size is, for some of the purposes to which chain is applied, of the utmost importance. One of the said dies is fixed and the other movable, the latter being made to descend upon the former either by the action of cams on a rotary shaft or by any of the other well-known methods of actuating movable dies, but I prefer to actuate the movable die by hydraulic pressure, as hereinbefore described under the first part of my invention. In making chain by the use of the tools constituting this part of my invention I make a semicircular bend in the middle of the rod of which the link is to be made. I then pass one end of the partially-formed link through the previously-made link, and afterwards bend the ends of the rod inwards and make them overlap one another. I afterwards heat the overlapping ends of the said partially-made link to a welding heat. I then place the partially-made link in the lower die and bring the upper die down upon it, when the welding together of the overlapping ends of the link is effected by the pressure or percussive action of the movable die. As the whole of the link being welded is (with the exception of the small part of its cold end, which is crossed by the previously-formed link,) enclosed between the dies during the welding, the link is unable to expand either longitudinally or transversely during the action of the dies, and the links made are consequently of uniform size.

Having explained the nature of my invention, I will proceed to describe, with reference to the accompanying drawings, the manner in which the same is to be performed.

Figure 1 represents in vertical section, and Figure 2 in elevation, the hydraulic machinery which I use in the manufacture of welded iron chain and welded steel chain according to my invention. The said machinery differs in no essential respect from hydraulic machinery used for other purposes, but has the modifications and additions, hereinafter explained, necessary to adapt it to the manufacture of the said chain.

$a$ is the hydraulic cylinder, and $b$ the ram. The cylinder $a$ and bed $d$ are made in one piece with the bracket or body $c$. $e f$ are the upper and lower dies, respectively, the former being raised and lowered by the ram $b$, and latter being fixed on the bed $d$. The passage $g$ at the top of the cylinder $a$ is connected with an hydraulic accumulator. The said hydraulic accumulator consists of a chamber or vessel, in the lower part of which water has been pumped under great pressure. The upper part of the said vessel or chamber contains highly-compressed air, which, when the water is allowed to escape, forces the said water out of the said accumulator under great pressure. As the said accumulator is well known, and constitutes no part of my invention, I have not thought it necessary to represent the same. On the top of the cylinder $a$ are two valves $h\ i$, pressed upwards to their seats by springs. By means of the rods $k\ l$, acted upon by the lever $m$, either of the valves $h\ i$ may be lowered at pleasure. When it is wished to make the upper die $e$ descend rapidly and to weld between it and the lower die $f$, a chain-link, in the manner hereinafter more particularly explained, the lever $m$ is moved in the direction indicated by the arrow in fig. 1. The valve $h$ is thereby depressed, and water from the accumulator passing along the passage $g$ through the seat of the valve $h$ into the passage $n$, enters the space $o$ between the top of the cylinder $a$ and the ram $b$. The ram $b$ and die $e$ are forced down rapidly, and the welding of the link of the chain is effected. The lever $m$ is now moved in a direction contrary to that indicated by the arrow in fig. 1, by which motion the valve $h$ is allowed to close by its spring, and the valve $i$ is opened. The water in the cylinder $a$ can now escape by the passage $p$, and the ram $b$ is raised in the cylinder $a$ by the coiled spring $q$. The manner in which the lever $m$ acts through the rods $k\ l$ on the valves $h\ i$ will be readily understood by an examination of figs. 1 and 2. My improvements in the dies to be used in the manufacture of welded iron chain and welded steel chain are illustrated in Figures 3 and 4, fig. 3 being a plan of the upper die and fig. 4 a plan of the lower die. The said dies (figs. 3 and 4) are represented in section at $e\ f$ in fig. 1, and in elevation at $e\ f$ in fig. 2. The dies (figs. 3 and 4) are marked with the same letters as in figs. 1 and 2. The said dies $e\ f$ have such a figure that when the die $e$ is brought down upon the die $f$ the space enclosed between them resembles that of the link to be made, with the exception that such portions are cut away as are necessary to admit of the link last formed, and through which the link about to be welded has been passed. The form of the cut-away portions will be understood by an examination of the drawings. By giving the dies $e\ f$, as far as possible, the figure of the whole of a link instead of only one-half of a link, as in ordinary dies, I secure great uniformity in the size of the links. The dies $e\ f$ may either be used with an hydraulic machine, as hereinbefore explained, or be used with any other pressing or stamping machinery by which dies are or may be worked; I prefer, however, to actuate the movable die by hydraulic pressure or by the direct action of steam applied after the manner in which it is applied in a steam-hammer. In preparing the links to be welded by the action of the dies $e\ f$ I make a semicircular bend in the middle of the rod of which the link is to be made, the said bend being so made that the two parts of the bent rod are not in the same plane. Figure 5 represents a rod so bent. One end of the bent rod, fig. 5, having been passed through the link last welded, its ends are turned inwards and made to overlap in the manner represented at $r$ in Figure 6. This bending and overlapping is effected by the machine represented in plan in Figure 7, side elevation in Figure 8, transverse section in Figure 9, and end elevation in Figure 10. The partially-made link, fig. 5, being passed through the link last made, is placed in the fixed die $s$. The movable dies $t\ t$ are made simultaneously to approach each other by turning the handle $w$, when the curved under-cut portions $u\ u$ (indicated in dotted lines) of the dies $t$ come against the ends of the partially-formed link and bend them inwards and over one another in the manner shown at $r$, fig. 6. The motion of the dies $t$ is effected by right and left-handed screws on the axis $v$, as seen in fig. 7. The handle $w$ gives motion to the dies $t$. The partially-made link, fig. 5, is raised to a low red heat before being operated upon by the machine, figs. 7, 8, 9, and 10. The bent and overlapping parts $r$ of the link are now raised to a welding heat and operated upon by the dies $e\ f$ in the manner hereinbefore described, when the said overlapping parts $r$ of the link are welded together by the pressure or percussive action of the movable die. During the welding of the parts $r$ of the link the whole of the link, except that part of its cold end which is crossed by the previously formed link, is enclosed between the dies $e\ f$, and the expansion of the link, either longitudinally or transversely, during the action of the dies, is thereby prevented. Besides the welding of the parts $r$ of the link the dies $e\ f$ also bring the sides of the link parallel.

Having now described the nature of my invention and the manner in which the same is to be performed, I wish it to be understood that I do not limit myself to the precise details herein described and represented in the drawings, as the same may be varied without departing from the nature of my invention, but I claim as my invention—

The improvements in tools for welding the links of welded iron chain and welded steel chain hereinbefore described and illustrated in figs. 1, 2, 3, and 4 of the accompanying drawings.

EDWARD TANGYE.

Witnesses:
    EBENEZER FORSTER BELLOWS,
    PETER VIRNEBURG.